Patented Sept. 16, 1947

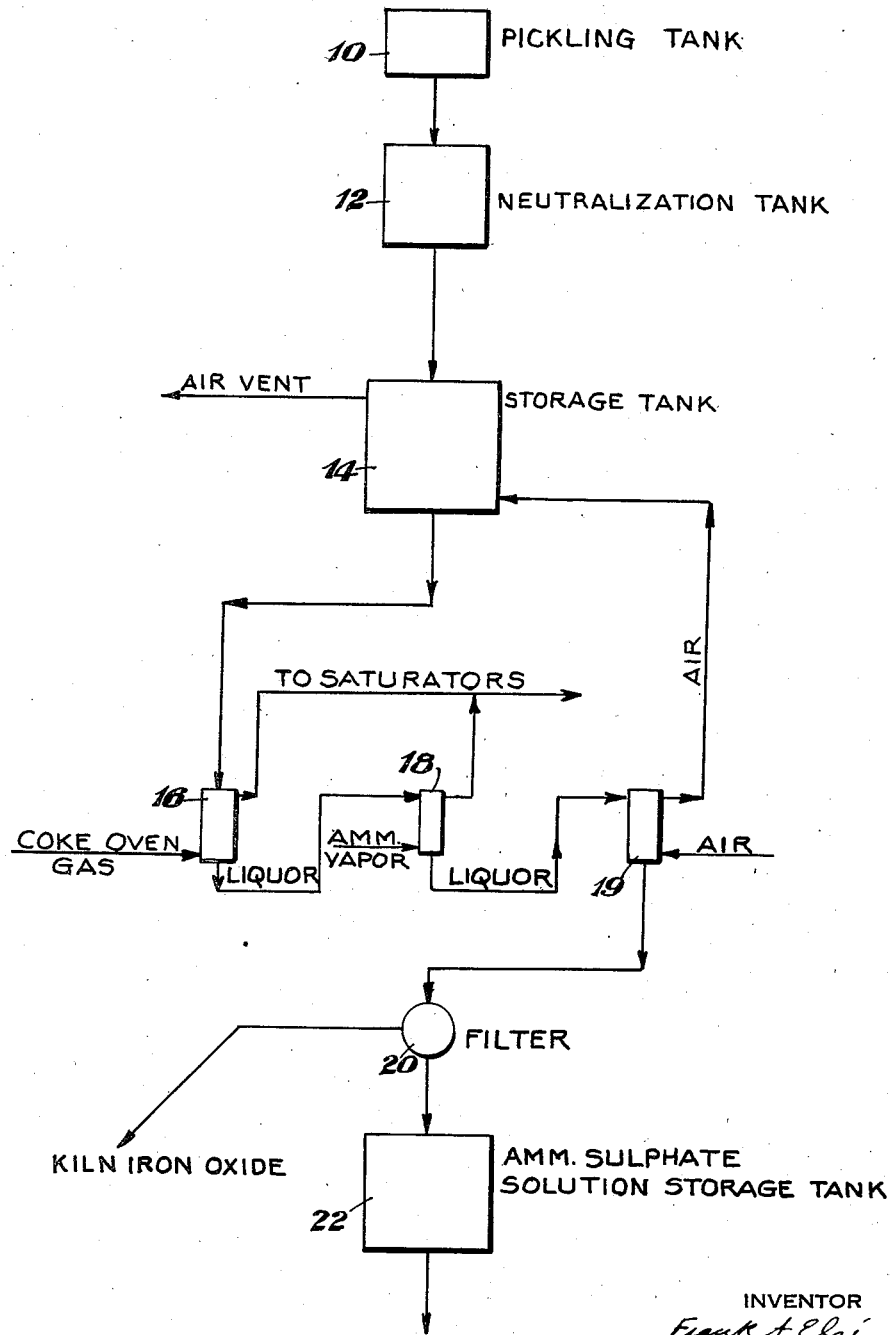

2,427,555

UNITED STATES PATENT OFFICE 2,427,555

PROCESS OF TREATING FERROUS SULPHATE SOLUTIONS

Frank A. Elzi, Pueblo, Colo., assignor to The Colorado Fuel and Iron Corporation, Denver, Colo., a corporation of Colorado Application December 2, 1944, Serial No. 566,384

2 Claims. (Cl. 23—200)

This invention relates to improvements in the production of ammonium sulfate and rouge from ferrous sulfate solutions, particularly those which are obtained in the form of used pickling liquors.

In the steel industry, sulfuric acid is commonly used as a pickling liquor for the removal of iron oxide from steel and iron. Common practice in pickling is to use a pickling bath kept at about 5% free sulfuric acid until the solution has an iron content corresponding to about 40% ferrous sulfate ($FeSO_4 7H_2O$). At this point the acid content is allowed to drop to about 2%, and the solution is then discarded, resulting in a loss of the ferrous sulfate and free acid which it contains. Various proposals have been advanced for the recovery of the iron and sulfate in such used pickling liquors, for example, by adding ammonia, and subjecting the resulting solution to aeration to oxidize the iron to the ferric state to precipitate it, after which the iron hydroxide is filtered off and recovered and the resulting solution of ammonium sulfate is evaporated down to recover the ammonium sulfate. In general, these proposals have not been commercially feasible because the iron is precipitated as a gelatinous or colloidal precipitate, difficult to separate from the solution, and because the quantity of iron precipitated has not been sufficient to result in an ammonium sulfate solution sufficiently free from iron.

The present invention provides improvements in the production of ammonium sulfate and ferric oxide from waste pickling liquors or similar solutions of iron sulfate, which may or may not contain free sulfuric acid. By the process of the present invention, the iron is substantially completely precipitated from the solution as ferric iron, and in a form which is readily filtrable, giving a filtrate which is substantially free from iron. The resulting ammonium sulfate solution, substantially free from iron, is then treated, by evaporation or by introduction into a coke oven ammonium sulfate saturator to recover the ammonium sulfate, while the iron hydroxide, which is substantially pure, may be dried and calcined to give a high grade of ferric oxide (rouge).

In accordance with the present invention, the ferrous sulfate solution, if it contains free sulfuric acid, is first treated to neutralize it, as by the use of scrap iron or the like, with conversion of all of the acid to ferrous sulfate. The resulting substantially neutral solution of ferrous sulfate is then treated, advantageously by a two-step process to be described, with ammonia, to raise its pH to 8.0 or higher, so that it is definitely alkaline, and, in this alkaline state, is aerated to oxidize the ferrous iron to ferric iron. The resulting suspension of ferric hydroxide in ammonium sulfate is filtered, the ferric hydroxide calcined to convert it to rouge, and the ammonium sulfate solution, i. e., the filtrate, is treated to recover the ammonium sulfate which it contains.

The treatment of the ferrous sulfate solution with ammonia to make it alkaline so that, on aeration, there is substantially complete precipitation of the iron, is advantageously carried out in two stages. In the first stage, ammoniation is accomplished by bringing the ferrous sulfate solution into contact with coke oven gases, so that ammonia from these gases is absorbed by the solution, and its pH is raised. In this stage of the operation, care must be taken that the pH is not raised above about 7.5. If, through the use of coke oven gases, sufficient ammonia is introduced into the ferrous sulfate solution to raise the pH to 8 or higher, subsequent aeration does not result in complete precipitation of the iron. It is possible that this is due to the solution of cyanides or cyanogen compounds present in the coke oven gas in the ferrous sulfate solution, which solubilize a substantial proportion of the iron and prevent its complete precipitation on subsequent aeration.

After the treatment with coke oven gas, with absorption of ammonia and elevation of the pH to about 7 to 7.5, but not above 7.5, the solution is treated with ammonia containing gases in the second stage. In this second stage, ammonia from a coke plant ammonia liquor still, or other source of relatively pure ammonia, free from cyanides and cyanogen compounds, is used in quantity sufficient to raise the pH of the solution above 8.0 and advantageously to about 8.5.

The alkaline ammoniated solution, with a pH of about 8.0 or higher, is then aerated, as in a spray or packed tower, to convert the ferrous iron to the ferric state and insure a precipitate of ferric hydroxide in a form which is readily separable from the solution of ammonium sulfate by filtration. Aeration at lower pH values than 8.0 results in the precipitation of but a part of the iron contained in the ferrous sulfate solution. For example, aeration of an ammoniated liquor containing 5.3% of iron at a pH of 6.0 results in a filtrate containing 4.6% of iron. Subsequent treatment of the resulting filtrate by the addition of an excess of pure ammonia results in additional precipitation of iron but gives a solution which still contains 1.6% iron. Aeration of an ammoniated liquor at a pH of 7.2 and subsequent filtration gives a product containing 1.82% of iron which after the addition of an excess of pure ammonia and filtration still contains 0.14% of iron. In contrast with this, aeration of a liquor at a pH of 8.5 gives a product which after filtration contains substantially no iron.

Because of the high pH, that is, relatively large ammonia content, of the liquor at the time of aeration, the air leaving the aeration tower will ordinarily contain substantial quantities of ammonia. This is readily recovered by bubbling air through the storage tank used for the ferrous sulfate solution, or it may be recovered in other ways.

The ammonium sulfate solution from the aeration tower, containing the ferric hydroxide in suspension, is delivered to a filter of a suitable type, in which the ferric hydroxide is removed by filtration. The separated ferric hydroxide may, by the usual calcining operation, be converted to high grade ferric oxide or rouge. The ammonium sulfate solution, which is relatively dilute, is advantageously treated to recover the ammonium sulfate therefrom. This may be accomplished by delivering it to an evaporator where much or all of the water may be removed, but is advantageously accomplished by delivering it to coke plant saturators, where it can either enter the saturator cycle so that the ammonium sulfate is crystallized out or it can be used as washing liquid for washing the crystallized ammonium sulfate, and then introduced into the saturator cycle.

The invention will be further illustrated by a specific example described in connection with the appended drawing, which is a flow sheet illustrating a plant in which the invention may be practiced with advantage.

In the flow sheet there is shown a pickling tank 10, for example, of a wire mill. From this, the liquor, when it is used, is delivered to a neutralization tank 12, usually by gravity flow. In a typical case, for a mill which accumulates 8,360 gallons of pickling liquor every 48 hours, the neutralization tank may have a capacity of about 20,000 gallons. It contains scrap iron which completes the neutralization of the pickling liquor, that is, reacts with the free acid in the liquor to form ferrous sulfate. Acid resisting material, such as brick, will be used for its construction.

From the neutralization tank the neutralized liquor is delivered to a storage tank 14, in the example under discussion having a capacity of about 35,000 gallons. Into this storage tank air from the aeration column, to be described, is introduced to recover any ammonia which it contains.

The neutralized liquor is pumped from the storage tank to the packed column 16. This may, for the treatment of the amount of liquor under discussion, be a steel column about 6 feet in diameter and 10 feet high, although, in view of the rapidity with which ammonia is absorbed, such a column may be unnecessarily large. The liquor is supplied to the top of the column, at the rate of about 6 gallons per minute. 4,530 cubic feet of coke oven gas per minute is forced through the tower in a direction countercurrent to the liquor. The gas velocity is thus about 3 feet per second, and absorption of ammonia from it is substantially complete. Of course, the quantity of coke oven gas will be varied, depending upon its ammonia content, and the figure given is that for a typical coke oven gas. The liquor from the bottom of the tower, which has a pH of about 7.5, is delivered to the top of the second tower 18, into the bottom of which is introduced ammonia from the ammonia liquor still, or other relatively pure ammonia, in excess. This column may also be a packed column, but will be smaller than the first column because of the lesser volume of gas required to be passed through it and may be, for example, 1 foot in diameter and 8 feet high. Excess ammonia will escape from the top of this tower, and advantageously is sent to the coke plant saturators for recovery. The ammoniated pickling liquor from the bottom of this tower, having a pH in excess of 8 and usually about 8.5, is then supplied to the top of the aeration tower 19, where the iron is oxidized to the ferric form. For the amount of liquor treated in accordance with this example, about 1,000 cubic feet of air per minute will be supplied to the bottom of the aeration tower to accomplish the oxidation. A suitable column may be about 4 feet in diameter and about 12 feet high.

The air leaving this column, which contains considerable ammonia, is advantageously led to the storage tank 14 and bubbled through the liquor therein to recover the ammonia which it contains.

The oxidized mixture from the aeration column is fed to a filter 20, which advantageously may be a continuous vacuum filter. About 10,000 pounds per day of precipitate will be removed from the liquor. The precipitate is readily removed by filtration, such that the filter capacity may approach 500 pounds per square foot per day and will be at least 250 pounds per square foot per day.

The separated precipitate is fed to a kiln where it is calcined to rouge. If desired, all or a part of this precipitate may be admixed with iron ore or the like in a sintering plant for the production of iron therefrom.

The filtrate is supplied to the storage tank 22, and then treated to recover the ammonium sulfate which it contains. This may be by evaporation, but advantageously, the solution is supplied to the coke plant ammonium sulfate saturating system, either as washing liquor for the crystallized ammonium sulfate or directly to the columns, for recovery of the ammonium sulfate which it contains.

Control of the amount of coke oven gas supplied to the first ammoniating column is advantageously accomplished by the use of a pH responsive control element actuated by the liquor from the bottom of the tower. Such control elements are well known and need not be described. In the process advantageously used, the devices are such as to control the quantity of coke oven gas fed to the tower to a quantity such that the liquor from the bottom of the tower will have a pH between 7 and 7.5. If the pH of this liquor exceeds about 7.5, the subsequent treatment with ammonia and aeration may still leave substantial proportions of soluble iron, probably in the form of cyanides or cyanogen compounds in the final solution, which will not be precipitated and will go through to the ammonium sulfate recovery system. Control of the amount of ammonia to the second ammoniation column is advantageously accomplished by the use of a pH responsive control element actuated by the liquor from the bottom of the column and adjusted to maintain the pH above 8.0, advantageously 8.0 to 8.5.

I claim:

1. The process of treating ferrous sulfate solutions which comprises treating the solution with coke oven gas and thereby causing it to absorb sufficient ammonia to elevate its pH to from 7.0 to 7.5, then treating it with ammonia free from cyanides and cyanogen compounds in quantity sufficient to elevate its pH to at least 8.0, then aerating the solution at a pH of at least 8.0 and separating precipitated ferric hydroxide from the resulting solution.

2. The process of treating pickling liquors which comprises bringing the liquor into contact with iron to neutralize free acid, treating the neutralized solution with coke oven gas in quantity sufficient to cause it to absorb enough ammonia to elevate its pH to a point not greater than 7.5, treating the resulting solution with concentrated ammonia gas from ammonia liquor stills to raise its pH to between 8.0 to 8.5, aerating the solution at a pH of 8.0 or higher, and separating the precipitated iron hydroxide from the resulting solution.

FRANK A. ELZI.

REFERENCES CITED

The following references are of record in the file of this patent:

UNITED STATES PATENTS

| Number | Name | Date |
|---|---|---|
| 997,237 | Carrick | July 4, 1911 |
| 961,764 | Falding | June 21, 1910 |
| 2,218,117 | Marek | Oct. 15, 1940 |
| 2,374,454 | Oliver | Apr. 24, 1945 |
| 2,333,672 | Oliver | Nov. 9, 1943 |

FOREIGN PATENTS

| Number | Country | Date |
|---|---|---|
| 545,767 | Great Britain | June 11, 1942 |